US006445342B1

(12) United States Patent
Thomas et al.

(10) Patent No.: US 6,445,342 B1
(45) Date of Patent: Sep. 3, 2002

(54) METHOD AND DEVICE FOR MULTI-USER FREQUENCY-DOMAIN CHANNEL ESTIMATION

(75) Inventors: Timothy A. Thomas, Palatine; Frederick W. Vook, Schaumburg, both of IL (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 09/608,760

(22) Filed: Jun. 30, 2000

(51) Int. Cl.$^7$ ................................................ H04B 7/00

(52) U.S. Cl. ..................................................... 342/367

(58) Field of Search ................................ 342/361, 367, 342/378, 383; 455/67.1, 67.6

(56) References Cited

U.S. PATENT DOCUMENTS

| | | | |
|---|---|---|---|
| 5,376,940 A | * 12/1994 | Abatzoglou | 342/192 |
| 5,525,995 A | * 6/1996 | Benner | 342/90 |
| 5,617,099 A | * 4/1997 | Warren et al. | 342/159 |
| 5,748,143 A | * 5/1998 | Melvin et al. | 342/162 |
| 5,982,327 A | * 11/1999 | Vook et al. | 342/380 |

OTHER PUBLICATIONS

Article entitled "Adaptive Frequency–Domain Equalization and Diversity Combining For Broadband Wireless Communications," (Author, Martin V. Clark, *IEEE JSAC*, vol. 16, pp. 1385–1395, Oct. 1998).

Article entitled "Basis Expansions Models and Diversity Techniques for Blind Identification and Equalization of Time–Varying Channels, " (Author Georgios B. Giannakis, *Proc. IEEE*, vol. 86, No. 10, pp. 1969–1986, Oct. 1998).

Article entitled "Characterization of Fast Fading Vector Channels for Multi–Antenna Communication Systems, " (Authors Gregory Raleigh Suhas N. Diggavi, Ayman F. Naguib, Arogyaswami Palraj, *Proc. 28th*, Asilomar Conf., Pacific Grove Ca, 5 pp., Nov. 1994.

(List continued on next page.)

*Primary Examiner*—Dao Phan
(74) *Attorney, Agent, or Firm*—Kenneth A. Haas

(57) ABSTRACT

The present invention is a technique of estimating the time and frequency response of at least one desired signal received by at least one antenna. The invention is an update formula for the time-invariant channel responses for multiple transmitting devices, called "Doppler channels", that model the time-varying channel between each of the transmitting devices and each receiving device. Through use of the update formula, the time-varying channels of the multiple transmitting devices can be better tracked than with prior inventions.

8 Claims, 5 Drawing Sheets

OTHER PUBLICATIONS

Article entitled "Determinstic Approaches for Blind Equalization of Time–Varying Channels with Antenna Arrays, " (Authors Hui Lui, Georgios B. Giannakis, *IEEE Trans on Sig. Proc.*, vol. 46, No. 11, pp. 3003–3013, Nov. 1998).

Article entitled "Least–Squares Multi–User Frequency–Domain Channel Estimation for Broadband Wireless Communication Systems ," (Authors Timothy A. Thomas, Fred W. Vook and Kevin L. Baum, *37th Allerton Conference*, Monticello, IL, 10 pp., Sept. 1999).

Article entitled "Linear and Nonlinear Programming ," (Author David G. Luenberger, Addison–Wesley Publishing Company, Monlo Park, CA, pp. 215–216, 1989).

Article entitled "Multicarrier Modulation for Data Transmission: An Idea Whose Time Has Come, " (Author John A. C. Bingham, *IEEE Comm. Mag.*, vol. 28, pp. 5–14, May 1990).

Article entitled "Robust Channel Estimation for OFDM Systems with Rapid Dispersive Fading Channels ," (Authors Ye G. Li, Leonard J. Cimini, Jr., Nelson R. Sollenberger, *IEEE Trans. On Comm.*, vol. 46, pp. 902–915, Jul. 1998).

Article entitled "Sinusoidal Model and Prediction of Fast Fading Processes ," (Authors Jeng–Kuang Hwang, Jack H. Winters, Globecom, pp. 892–897, 1998).

Article entitled "Space–Time Modems for Wireless Personal Communications ," (Author A. J. Paulraj, Boon C. Ng, *IEEE Personal Communications Magazine*, pp. 36–48, Feb. 1998).

Article entitled "Analysis of DFT–Based Channel Estimators for OFDM*" (Authors Ove Edfors, Magnus Sandell, Jan–Jaap van de Beek, Sara Kate Wilson, Per Ola Börjesson, This work has been presented in part at the 1995 Vehicular Technology Conference (VTC '96) in Chicago, Illinois, Jul. 25–28, 1995, pp. 815–819).

Article entitled "Channel Estimation for OFDM Systems with Transmitter Diversity in Mobile Wireless Channels " (Authors Ye(Geoffrey) Li, Senior Member, IEEE, Nambirajan Seshadri, Senior Member, IEEE, and Sirikiat Ariyavisitakul, Senior Member, IEEE, pp. 461–471, IEEE Journal on Selected Areas in Communications, vol. 17, No. 3, Mar. 1999).

* cited by examiner

METHOD AND DEVICE FOR MULTI-USER FREQUENCY-DOMAIN CHANNEL ESTIMATION

This application is related to Ser. Nos.: 09/607,733 and 09/607,736 both filed on Jun. 30, 2000.

FIELD OF THE INVENTION

The present invention generally relates to the field of communication systems and more particularly, to improve the technique of estimating the time and frequency response of at least one desired signal received by at least one antenna.

BACKGROUND OF THE INVENTION

In a wireless communication system, a major design challenge is to maximize system capacity and performance in the presence of interference, and a time-varying multipath channel. Multipath propagation is caused by the transmitted signal reflecting off objects near the transmitter and receiver and arriving at the receiver over multiple paths. Interference in a communication system can come from a variety of sources depending on the particular system deployment. If the system is in motion, then Doppler-induced time variations become an issue. Interference and multipath are major factors that limit the achievable performance and capacity of a communication system because both effects interfere with the ability of a communication receiver to properly decode the transmitted data.

In a multipath propagation channel, the transmitted signal propagates to the receiver over a finite number $L_p$ of propagation paths, where each path has an associated time delay and complex gain. In such a channel, the communication receiver receives the superposition of $L_p$ delayed, attenuated, and phase-shifted copies of the transmitted signal. The number of paths $L_p$ and their time delays and phase shifts depends on the physical location of the various scattering objects (such as buildings, automobiles, and trees) in the immediate vicinity of the transmitter and receiver. The complex attenuation (magnitude and phase) of each path depends on the length of each path, as well as the material composition of any scatterers or reflectors encountered along the path.

The presence of multipath can severely distort the received signal. In a multipath environment, the multiple copies of the transmitted signal can interfere constructively in some portions of the occupied bandwidth. In other portions of the occupied bandwidth, the multiple copies can interfere destructively at the receiver. This signal duplication causes unwanted variations in the received signal strength over the bandwidth occupied by the signal. Furthermore, if the difference in the path delays of the various propagation paths is significantly greater than the duration of a transmitted information symbol, then intersymbol interference is present at the receiver. When intersymbol interference is present, the received signal is corrupted by prior transmitted symbols propagating over paths having delays relative to the shortest path that are longer than the duration of an information symbol. The demodulation process (the process of determining which information symbol was transmitted) becomes difficult in the presence of intersymbol interference.

In a mobile wireless communication system, the complex attenuation of each of the multipath components of the received signal becomes a time-varying function of the transmitter's path and speed throughout the scattering field local to the transmitter's position. The transmitter's motion causes the received signal strength at a particular portion of the occupied bandwidth to vary as time progresses. In a mobile multipath channel, the overall channel response not only varies across the occupied bandwidth of the signal, but also across time as well.

In addition to multipath, interference is another system component that limits the performance of a communication system. If the system is deployed in an unlicensed band, then other users of the band can generate interference. And in a cellular system employing frequency reuse, transmitters in another cell that is allocated the same set of frequency channels can generate co-channel interference. Frequency reuse is the practice of assigning the same frequency channels to multiple users of the allocated spectrum.

Many cellular communication systems employ the technique of frequency reuse in order to maximize the utilization of the frequency spectrum allocated to a wide-area system deployment. In a cellular system, a large geographical area is divided into smaller regions called cells, where each cell is served by a single base station operating on an assigned set of frequency channels. Within each cell, multiple subscriber devices are allowed to communicate with the base station on the frequency channels assigned to that cell. The concept of frequency reuse involves allocating different sets of frequency channels to the cells belonging to a particular group and then reusing the same sets of frequencies to the cells belonging to another group of cells.

The reuse factor of a cellular system is defined to be the minimum distance between two cells that are allocated the same set of frequency channels divided by the radius of a cell. A cellular system employing a large reuse factor does not utilize the allocated spectrum as efficiently as a cellular system employing a smaller reuse factor. However, the level of co-channel interference received by a receiver in the cellular system is directly dependent on the reuse factor. Reducing the reuse factor tends to increase the level of co-channel interference experienced by a receiver. To better utilize the available spectrum, it would be advantageous to be able to suppress the effects of co-channel interference.

To compensate for co-channel interference, multi-user channel estimation along with interference suppression or cancellation can be used. Most existing decision directed multi-user channel estimators use the channel estimate from a previous data block to demodulate the current data block. In the presence of Doppler induced time variations, system performance (that is, the performance of the channel estimation and interference suppression/cancellation algorithms) may be impaired when the channel changes significantly from one data block to the next. In this situation, there is a lag or time delay between the time in which the channel is estimated and the time in which the channels estimate is used in the demodulation process. This estimation lag problem becomes more serious as the level of Doppler-induced channel variations increases.

Thus, there is a need for a method and device for estimating the time and frequency response of at least one transmitted signal received on at least one receive antenna. In addition, there is a need for a method and device that has the ability to predict the channel at the next data block, thus minimizing the estimation lag problem.

DETAILED DESCRIPTION OF THE PRESENTLY PREFERRED EMBODIMENTS

Figure 1:
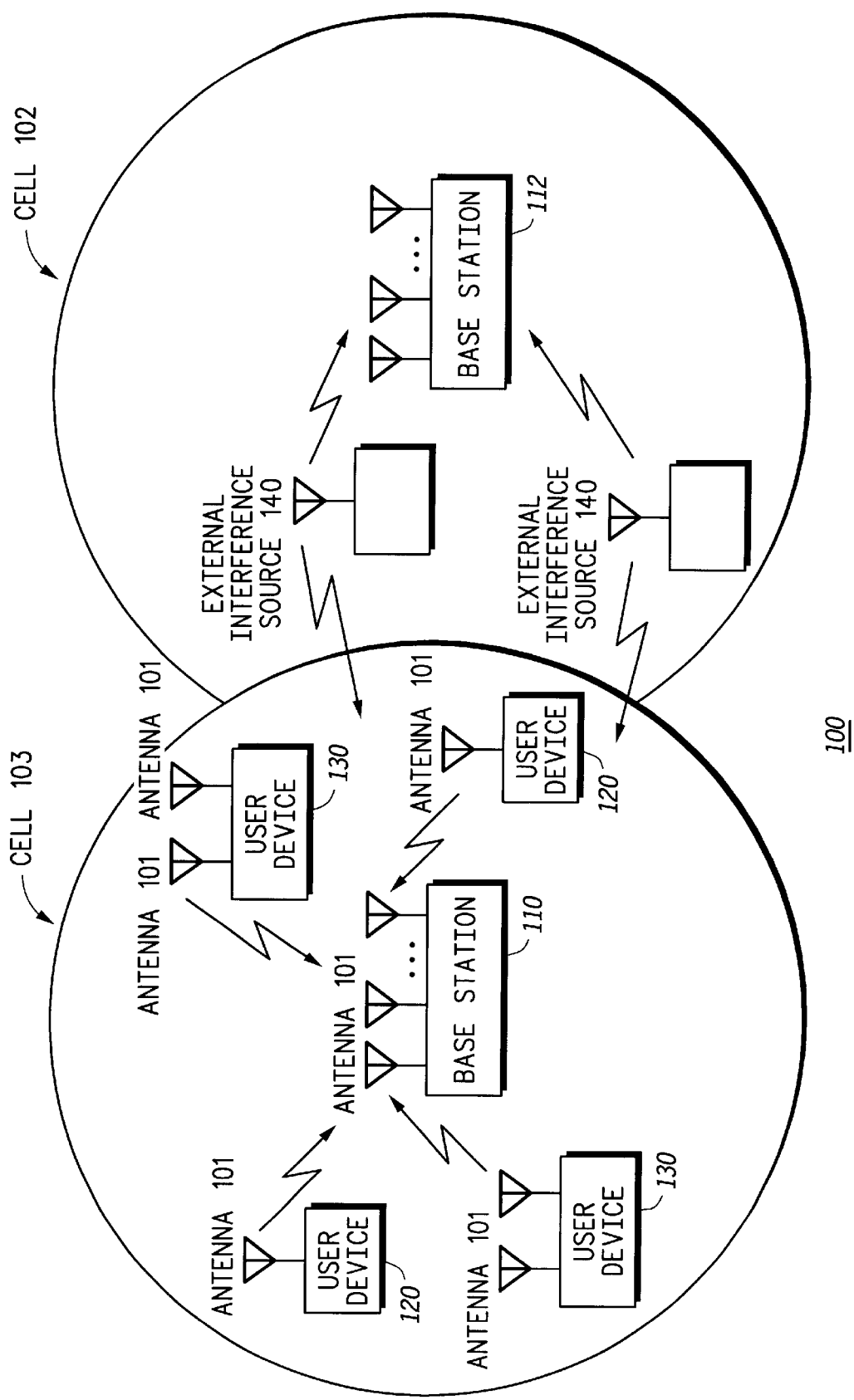
FIG. 1 is an overview diagram of a preferred embodiment of a cellular communication system in accordance with the present invention.

An adaptive antenna array is an array of antennas connected to a communications receiver and operates by combining the signals received by the antennas so as to optimize in an adaptive fashion the receive characteristics of the array. By weighting and then summing the multiple antenna signals, the adaptive antenna array can adapt its angular response, sometimes called the array pattern, while it operates in response to changes in the propagation environment. While operating, the adaptive antenna attempts to maximize the reception of the signal received from a desired transmitting device, as it simultaneously minimizes the effects of all other interfering signals and noise. In a communication system, the interference suppression capability of an adaptive antenna array offers the potential to reduce co-channel interference, compensate for time variations, improve coverage quality, and increase overall system capacity.

Adaptive antenna arrays also offer the possibility of providing a new way of multiplexing multiple devices: Spatial Division Multiple Access (SDMA). With SDMA, multiple devices can simultaneously share the same channel (i.e., time, frequency, or code channel) and are separated and simultaneously decoded by the receiver array on the basis of their spatial position relative to the antenna array. When successfully deployed, SDMA promises to provide enormous increases in system capacity.

Spatial Division Multiple Access is a difficult technology to implement because of the rapidly varying multipath fading channel. In an SDMA system, the devices that are sharing a channel provide interference to the receiver processing algorithms that must decode the signals transmitted by the devices. When a receiver-processing algorithm attempts to decode one SDMA device, the other SDMA devices provide strong interference to the decoding algorithm. The adaptive antenna implementing SDMA suppresses the effects of the other devices when attempting to decode one of the transmitting devices.

A problem associated with employing both an equalizer and an adaptive antenna in a wireless communication system lies in the design of an algorithm and device having adequate ability to adapt to changes in the signal environment. For best performance, adaptive antennas that operate in a fast-fading multipath environment must adapt to the rapidly varying channel as well as to any changes in the nature of the desired and interfering signals. In a broadband system, a frequency-selective multipath channel will cause significant variations in the channel across the occupied bandwidth of the received signal. Equalization and interference-suppression algorithms, which cannot track these channel variations both in time and frequency, will suffer significant degradation in performance as measured by the Bit-Error Rate (BER) or Signal-to-lnterference-plus-Noise Ratio (SINR).

A common ingredient in many equalizers and adaptive antenna arrays is an algorithm and device that estimates the characteristics of the multipath propagation environment, channel transfer function, or channel frequency response, between the desired transmitting device and each of the at least one receiving antenna at the communication receiver. When SDMA is being employed in a broadband system operating in a frequency-selective environment, then an adaptive antenna array generally requires an estimate of the channel frequency response between each receiving antenna and each of the transmitting devices that are simultaneously sending information to the array. The channel estimation algorithm in this case should operate to simultaneously solve for the channel responses of the multiple transmitting devices.

Given the need for higher system capacities in wireless communication systems, adaptive antennas and advanced equalization techniques are important for satisfying the ever-increasing need for high data rate communications. To support the operation of adaptive antennas and equalizers, it is advantageous to have a method and device that tracks the time-varying frequency response of a broadband system accurately enough to permit effective equalization and interference suppression. Given the difficulties associated with implementing SDMA and the deleterious nature of the multipath-fading environment, such a device would enable improved equalization and interference suppression performance in a mobile broadband communication system.

Briefly described, the present invention is a method and device for calculating the time-varying channel frequency responses of the signals transmitted by at least one transmitting device and received on at least one receive antenna. The present invention uses a conceptual model that characterizes the time-varying channel between a single transmit and single receive antenna as the sum of multiple time-invariant channels called "Doppler" channels. When estimating and tracking a time-varying channel, the invention updates the estimates of the Doppler channels based on the new channel estimate and the previous Doppler channel estimates. The Doppler channel model provides the invention with the ability to predict the channel at future times, thus minimizing estimation lag problems common to typical decision-directed techniques.

The method and device of the present invention can be incorporated into a communications receiving device, base station, or subscriber unit. In the present invention, the term "device" can refer to any type of communications device such as a base station, subscriber unit, or other communications receiver or transmitter.

The present invention is implemented in a communication system where at least one desired transmitting device transmits information to a communication receiver having at least one antenna. In a preferred embodiment, pluralities of transmitting devices simultaneously transmit information to a communication receiver having a plurality of antennas. A transmitting device transmits its information in bursts that contain two components: a training interval and a data interval. The information transmitted in a training interval contains pilot symbol sequences of content and duration known by both the transmitting device and the communication receiver. The data interval contains data symbols that must be recovered at the receiving device. In the present invention, the term "burst" refers to any one of the following: a short or isolated transmission, a portion of a longer transmission, a portion of a continuous transmission, a portion of a semi-continuous transmission, a time-limited transmission, a bandwidth-limited transmission, or any combination thereof.

The ability to receive and recover the information transmitted simultaneously by more than one device significantly increases the capacity of the communication system. Conventional cellular systems permit only one device to transmit on a particular frequency channel within a cell for any predetermined time interval. Providing for more than one device to transmit to a base station on the same frequency channel at the same time will multiply the capacity of the system by a factor equal to the number of devices that are allowed to simultaneously transmit. Devices incorporating algorithms for providing this capability must have the ability to track any variations in the time and frequency-selective channel. The method and device of the present invention provide time-varying channel estimates for use in adaptive antenna equalization techniques, making communication systems more efficient.

A preferred embodiment of the present invention described below typically operates in a time-varying delay-spread channel and operates under the assumption that the channel can change significantly over the occupied bandwidth and significantly in time. This requires a frequency-domain multi-user channel estimation technique for tracking the time and frequency variations of multiple SDMA users sharing the same time frequency channel.

FIG. 1, numeral 100, illustrates a wireless communication system in accordance with the preferred embodiment of the present invention. As shown in FIG. 1, a Base Station 110 provides communication service to a geographic region known as a cell 103. At least one User Devices 120 and 130 communicate with the Base Station 110. In some embodiments of the communication system of FIG. 1, at least zero External Interference Sources 140 share the same spectrum allocated to the base station 110 and subscriber devices 120 and 130. The External Interference Sources 140 represent an unwanted source of emissions that interferes with the communication process between the Base Station 110 and the User Devices 120 and 130. The exact nature and number of the External Interference Sources 140 will depend on the specific embodiment of the communication system of FIG. 1. In some cases, as is shown in FIG. 1, an External Interference Source will be another User Device 140 (similar in construction and purpose to User Device 120) that is communicating with another Base Station 112 in the same frequency spectrum allocated to Base Station 110 and User Devices 120 and 130. As shown in FIG. 1, User Devices 120 has a single antenna, while User Devices 130 have at least one antenna. The method and device of the present invention can be implemented as part of a Base Station 110 as well as part of a User Device 120 or 130.

Figure 2:
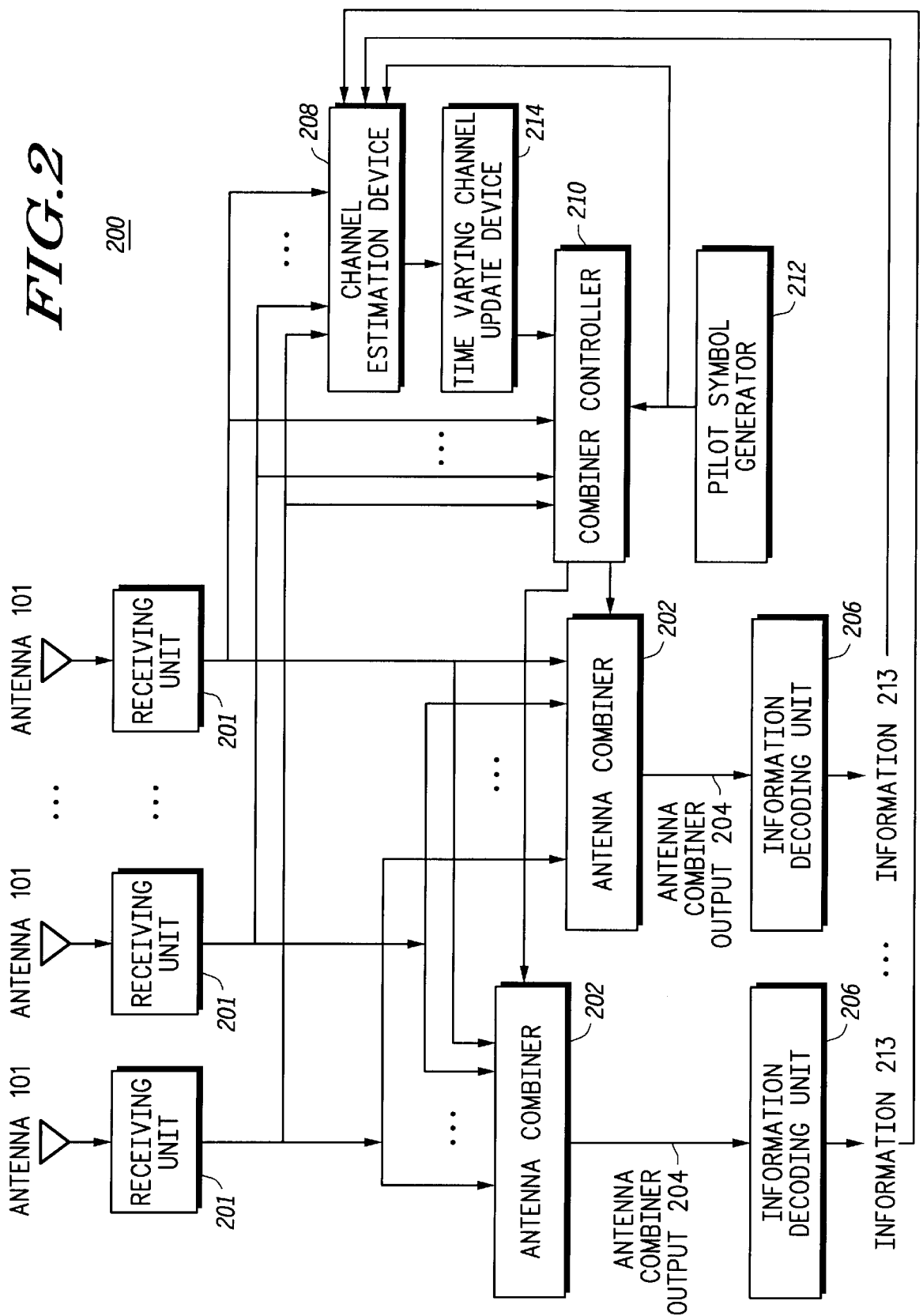
FIG. 2 is a block diagram illustrating a preferred embodiment of a device in accordance with the present invention.

FIG. 2, numeral 200, is a block diagram illustrating a device in accordance with the present invention. The communication receiver in accordance with the present invention includes at least one antenna (101) wherein the outputs of the antennas are each provided to a receiving unit (201). The outputs of the receiving units (201) are provided to at least one Antenna Combiner (202). The signals from the receiving units (201) are also fed into the Combiner Controller (210), which regulates the operation of the at least one Antenna Combiner (202). The signals from the receiving units (201) are also fed into the Channel Estimation Device (208). The Pilot Symbol Generator (212) generates pilot symbol information that is used by the Combiner Controller (210) to control the Antenna Combiner (202). The pilot symbol information generated by the Pilot Symbol Generator (212) is also used by the Channel Estimation Device (208) to estimate the time-varying frequency responses of the transmitting devices (110, 112, 120, 130, or 140, or any combination thereof). The output of an Antenna Combiner (202) is fed into an Information Decoding Unit (206), which decodes the Antenna Combiner Output (204) and generates data information (213) that was received by the Antennas (101). The output of the information decoding unit (206) is fed into the channel estimation device (208) to estimate the time-varying frequency response of the transmitting devices through a decision directed fashion. The output of the Channel Estimation Device (208) is fed into the Time-Varying Channel Update Device (214) of the present invention, which generates a Doppler channel estimate for use in the Antenna Combiner (210).

Figure 3:
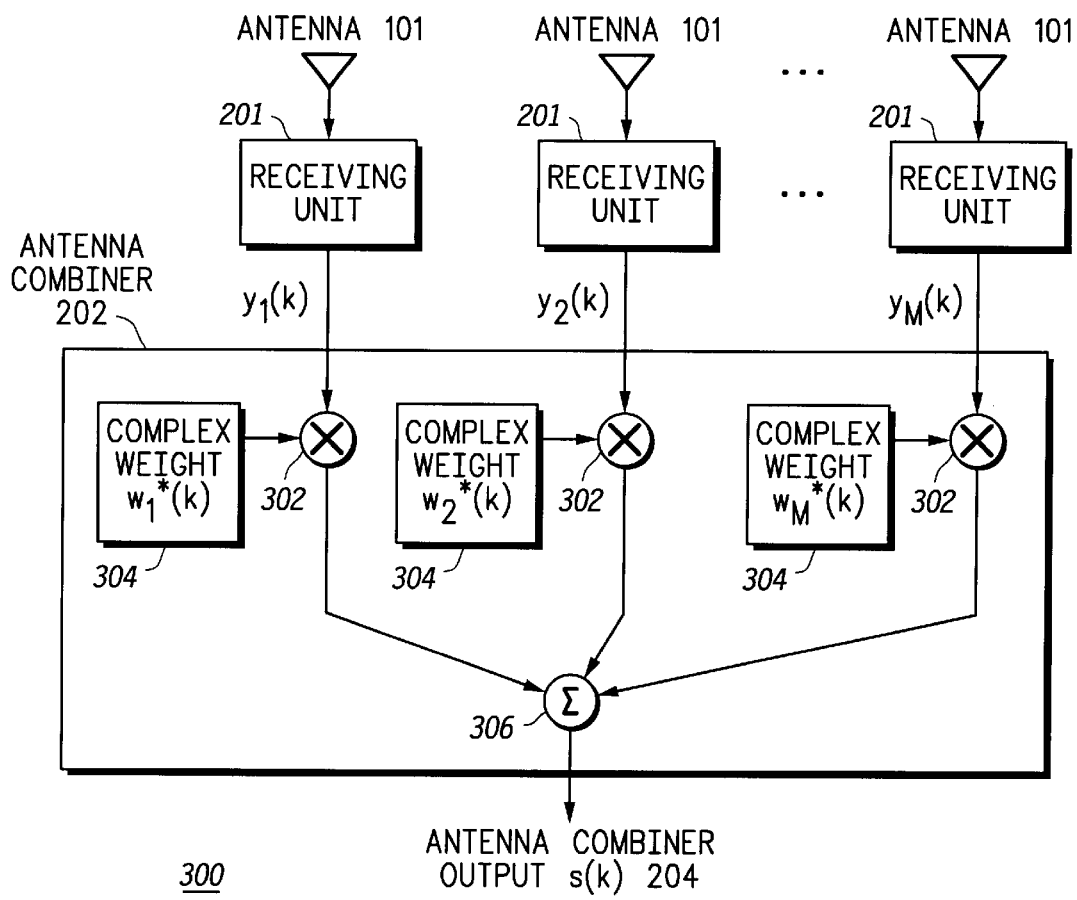
FIG. 3 is a block diagram illustrating details of the Antenna Combiner of the device of FIG. 2.

FIG. 3, numeral 300, is a block diagram illustrating details of the Antenna Combiner of the device of FIG. 2. Antenna Combiner (202) is coupled to the receiving units (201), which in turn are coupled to the antennas (101). In a preferred embodiment, the receiving units (201) may include radio frequency pre-amplifiers, filters, and other devices that can be used to convert the radio frequency signal received by the antenna down to a digital stream of baseband equivalent complex symbols. As shown in FIG. 2, the output of the i'th receiving unit (201) (where i is an integer between 1 and M inclusive, and M is the total number of antenna elements) is mathematically denoted by $y_i(k)$, where k and i are integers, and is provided to the antenna combiner (202) which can be in the form of a plurality of complex multipliers (302) which multiply the output of each receiving unit (201) by a complex weight (304), mathematically denoted as $w_i(k)$, and a combiner (306) sums the outputs of the plurality of complex multipliers (302). The values of the complex weights (304) are controlled by the Combiner Controller (210), shown in FIG. 2.

Figure 4:
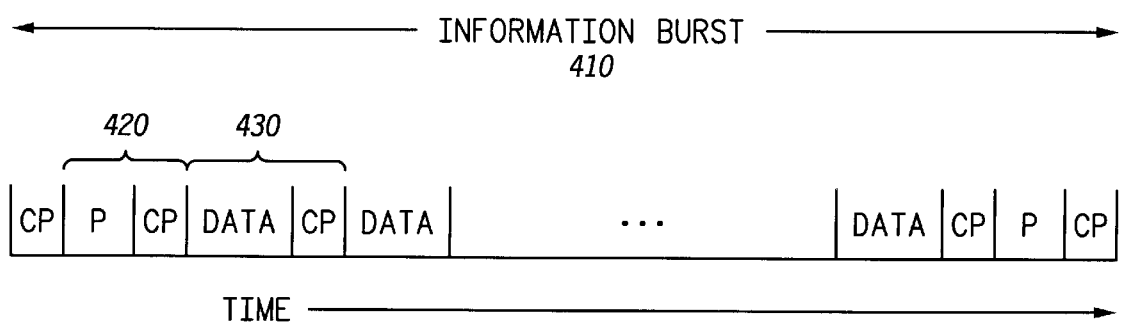
FIG. 4 is a representation of an information burst for Single or Multi-carrier Modulation, which can be used by the communication system in which the device in FIG. 2 operates.

FIG. 4, numeral 400, is a timing diagram illustrating the structure of an information burst for single or multi-carrier modulation (410) transmitted between a plurality of transmitting devices (e.g., Base station 110, User Device 120, or 130) and a receiving device (e.g., Base station 110, User Device 120, or 130). An information burst (410) includes at least one training interval (420) and at least one data interval (430). During a training interval (420), a transmitting device (e.g., a Base station 110, or a User Device 120, or a User Device 130, or a base station 112, or in some cases a User Device 140, or any combination thereof) transmit training information consisting of at least one pilot symbol of duration, content, and timing known to both the transmitting device and the receiving device (a Base station 110, or a User Device 120, or a User Device 130). The Channel Estimation Device (208) uses the outputs of the receiving units (201) during at least one of the training intervals (420) and the knowledge of the transmitted sequence of pilot symbols to compute an estimate of the channel time and frequency response between the plurality of transmitting devices (a Base station 110 or 112, or a User Device 120, 130, or 140, or any combination thereof) and the antennas (101) of the receiving device. To update the channel estimate, the channel estimation device (208) uses the outputs of the information decoding units (206) and the outputs of the receiving units (201) during at least one data interval (430) to compute an estimate of the channel frequency response between the plurality of transmitting devices (a Base station 110 or 112, or a User Device 120, 130, or 140, or any combination thereof) and the antennas (101) of the receiving device. The information burst acts in accordance with all channel estimations using cyclic prefixes. The present invention uses the channel estimates from any channel estimation procedure. Also, the channel estimates can be in the frequency domain as well as the time domain.

Figure 5:
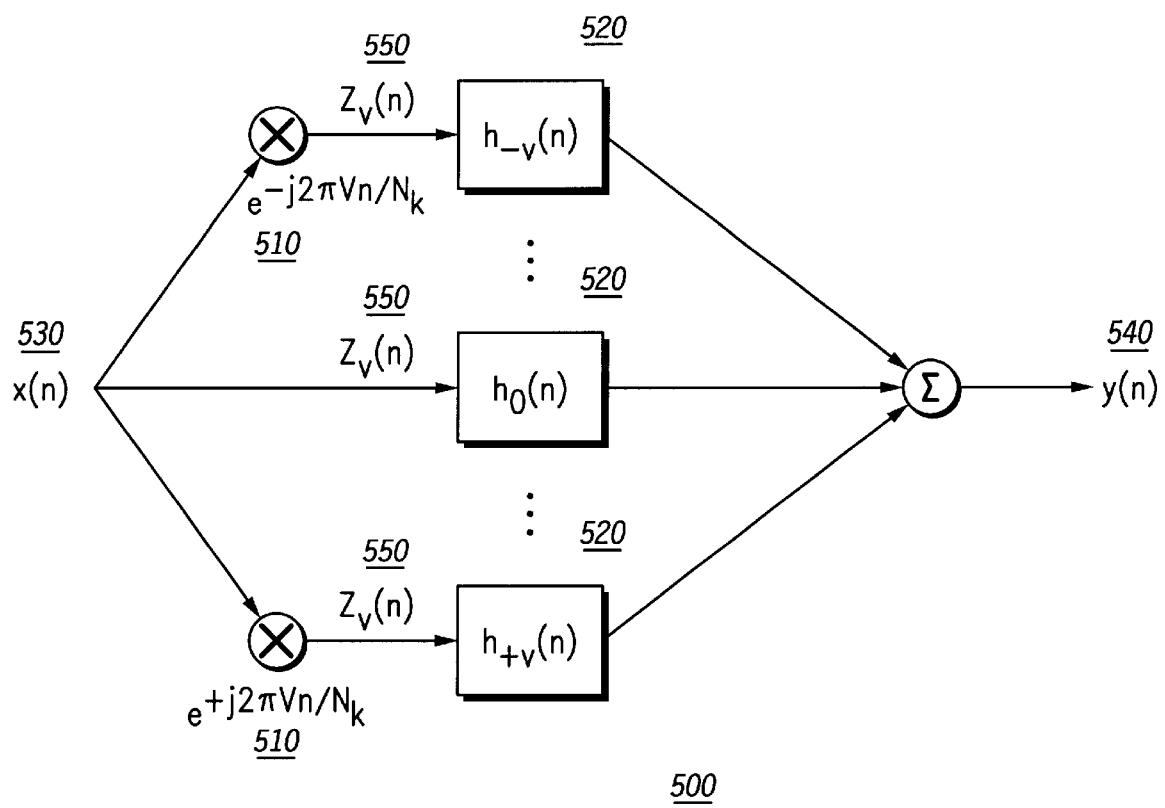
FIG. 5 is a is a representation of a time invariant channel (i.e., Doppler channel) model for a single-input single-output time varying channel.

FIG. 5, numeral 500, is a representation of the Time Invariant Channel Model for a single input single output time varying channel. FIG. 5 shows a diagram of the time-varying channel model. FIG. 5 shows the structure of the model for the time-varying impulse response h(l,n), where l is the index of the differential delay of the impulse response, and n is the time sample number. The output from a single transmitter, x(n) (530) is sent through a time-varying channel with L taps and the received signal at a single receive antenna is y(n) (540). The output of the time-varying channel (540) can be adequately modeled as the sum of the convolution of $V_T=(2V+1)$ "Doppler channels" (520), $h_v(n)$ (v=−V, . . . +V) with x(n) (530) times the corresponding Doppler sinusoid $e^{-j2\pi vn/N_k}$ (510). In equation form, y(n) is:

$$y(n) = \sum_{v=-V}^{+V} h_v(n) * (x(n)e^{j2\pi vn/N_k}) + n(n)$$

$$= \sum_{v=-V}^{V} h_v(n) * z_v(n) + n(n)$$

where the "Doppler signal", $z_v(n)$ (550), is $z_v(n) = x(n)e^{j2\pi vn/N_k}$ and * indicates linear convolution. The value of $N_k$ is fairly arbitrary but the channel produced by this channel model will repeat over the data block unless $N_k$ is greater than the total length of the received data block that is processed. Thus in a preferred embodiment, $N_k$ is chosen to be twice the size of the data block. A description of the update formula and its reference to Doppler Channels is now given. Doppler channels are channel estimates produced at each time sample for the purpose of eliminating the channel estimation lag problem and estimating the channel at any time. Doppler channels are time invariant and work by modeling user j's (j=1 . . . J where J is the number of desired transmitting devices) time-varying channel impulse response $h_j(l,b)$ as a linear combination of $V_T=(2V+1)$ time invariant tap gain values, $g_{j,-v}(l)$ through $g_{j,+v}(l)$ as follows:

$$h_j(l,b) = q^T(l)g_j(l) \text{ where}$$

$$(V_T \times 1)q(b) = \begin{bmatrix} e^{-j2\pi Vb/N_k} \\ \vdots \\ e^{+j2\pi Vb/N_k} \end{bmatrix}$$

and $$(V_T \times 1)g_j(l) = \begin{bmatrix} g_{j,-v}(l) \\ \vdots \\ g_{j,+v}(l) \end{bmatrix}$$

Where l indicates the lag (or tap number) of the channel estimate, b can refer an absolute time or to a particular data or pilot block (also referred to as a baud) and $N_k$ is the Doppler DFT size. Although the actual value of $N_k$ has little effect on the performance of the invention, the channel response of the model will repeat within the received pilot/data block being processed unless the value of $N_k$ is chosen to be greater than the total length of the received pilot/data block being processed. Thus, one option for choosing $N_k$ is to make it twice the size of the pilot/data block.

So the time-domain taps for all J users at baud b are given as: h(b)=Gq(b), where:

$$(JL \times 1)h(b) = \begin{bmatrix} h_1(0,b) \\ \vdots \\ h_1(L-1,b) \\ \vdots \\ h_J(0,b) \\ \vdots \\ h_J(L-1,b) \end{bmatrix}$$

and $$(JL \times V_T)G = \begin{bmatrix} g_1^T(0) \\ \vdots \\ g_1^T(L-1) \\ \vdots \\ g_J^T(0) \\ \vdots \\ g_J^T(L-1) \end{bmatrix}$$

Assuming we have channel estimates, h(b), for b=1 through B, the Doppler channel estimates, G, are given as: $G = H_B Q_B^H (Q_B Q_B^H)^{-1}$, where:

$$(JL \times B)H_B = [h(1) \ldots h(B)] \text{ and } (V_T \times B)Q_B = [q(1) \ldots q(B)]$$

Note that the channel estimates can be from any channel estimation procedure and the channel estimates can be in the frequency domain as well as the time domain.

In order to find an update formula for G, we assume we have an estimate for h(B+1) and the previous estimate for G which we will call $G_{old}$. $G_{old}$ and $G_{new}$ are:

$$G_{old} = H_B Q_B^H (Q_B Q_B^H)^{-1} \text{ and } G_{new} = H_{B+1} Q_{B+1}^H (Q_{B+1} Q_{B+1}^H)^{-1}$$

With some manipulation, $G_{new}$ becomes:

$$G_{new}(h(B+1)q^H(B+1) + H_B Q_B^H)(Q_B Q_B^H + q(B+1)q^H(B+1)^{-1}$$

Note that the inverse is in a form such that we can use the following identity:

$$(A + bc^H)^{-1} = A^{-1} - \frac{A^{-1}bc^H A^{-1}}{1 + c^H A^{-1} b}$$

Using this identity for the inverse, we get:

$$G_{new} = (h(B+1)q^H(B+1) + H_B Q_B^H)$$

$$\left( (Q_B Q_B^H)^{-1} - \frac{(Q_B Q_B^H)^{-1} q(B+1) q^H(B+1)(Q_B Q_B^H)^{-1}}{1 + q^H(B+1)(Q_B Q_B^H)^{-1} q(B+1)} \right)$$

With some manipulation, $G_{new}$ is given as:

$$G_{new} = G_{old}R_{B+1} + h(B+1)r_{B+1},$$

where:

$$(V_T \times V_T)R_{B+1} = I_{V_T} - q(B+1)r_{B+1} \text{ and}$$

$$(1 \times V_T)r_{B+1} = \frac{q^H(B+1)(Q_B Q_B^H)^{-1}}{1 + q^H(B+1)(Q_B Q_B^H)^{-1} q(B+1)}$$

Because the number of Doppler channels, $V_T$, is typically small (e.g., $V_T=3$ in the simulations), the computational complexity of this update formula is small. This is also due to the ability to pre-compute $R_B$ and $r_B$ since they do not depend on data. When $B<V_T$, $(Q_B Q_B^H)^{-1}$ is not invertible. This situation is remedied by diagonally loading the inverse by the estimated noise power.

An embodiment for the present invention is a communications receiving device, base station, or subscriber unit operating in either a single carrier or a multicarrier communication system such as Orthogonal Frequency Division Multiplexing (OFDM). The present invention can also be embodied in a communication receiving device, base station, or subscriber unit operating in a communication system employing direct sequence spread spectrum signaling.

In both multicarrier (such as OFDM) and single carrier systems, information burst (410) can be referred to as a time-frequency slot.

Figure 6:
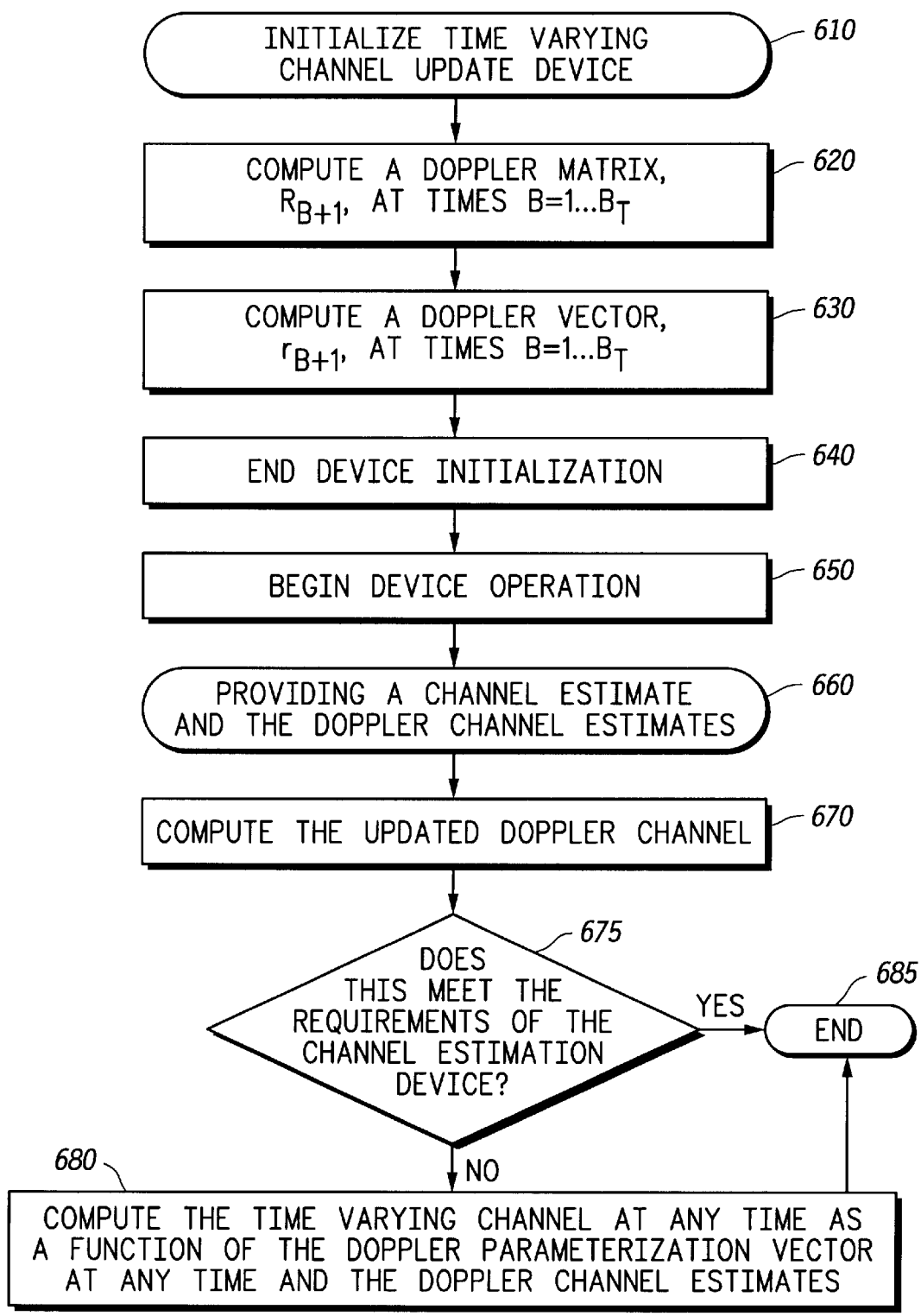
FIG. 6 is a flow chart representation of one embodiment of the method performed by the Time-Varying Channel Update Device of FIG. 2 to provide updated time-varying channel estimation between a transmitting device and a receiving antenna in accordance with the present invention.

FIG. 6 shows a flow chart that illustrates the steps performed by the Time-Varying Channel Update Device (214) to compute Doppler channel estimates. Establishing and storing the values of the predetermined channel model (e.g., L, $V_T$, and $N_k$) and system parameters (610) initializes the Time Varying Channel Update Device. Next, Block 620, a Doppler matrix is computed at all times where the Doppler channels will be updated (in the preferred embodiment, $B=1 \ldots B_T$ where $B_T$ is the total number of data blocks) B, $R_B$, as a function of the Doppler parameterization matrix at time B−1, $Q_{B-1}$, and the Doppler parameterization vector at time B, $q(B)$. The full expression as has been previously mentioned is:

$$(V_T \times V_T)R_B = I_{V_T} - q(B)r_B \text{ and}$$

$$(1 \times V_T)r_B = \frac{q^H(B)(Q_{B-1} Q_{B-1}^H)^{-1}}{1 + q^H(B)(Q_B Q_{B-1}^H)^{-1} q(B)}$$

$$(V_T \times B)Q_B = [q(1) \ldots q(B)],$$

$$(V_T \times 1)q(b) = \begin{bmatrix} e^{-j2\pi Vb/N_k} \\ \vdots \\ e^{+j2\pi Vb/N_k} \end{bmatrix}$$

Note when $B<V_T$ that $(Q_B Q_B^H)^{-1}$ is not invertible. This situation is remedied by diagonally loading the inverse by the estimated noise power (i.e., by computing $(Q_B Q_H^B + (\sigma^2 I))^{-1}$, where $\sigma^2$ is the noise power and I is the identity matrix). The device (214) initialization is accomplished by computing a Doppler vector at time B+1, $r_{B+1}$, as a function of the Doppler parameterization matrix at the times of interest ($B=1 \ldots B_T$ in the preferred embodiment), $Q_B$, and the Doppler parameterization vector at time B, q(B) (630).

With initialization now completed (640), the device estimation update operation begins (650). The updating algorithm is provided a channel estimate at time B+1, h(B+1), and the Doppler channel estimates at time B, $G_B$ (block 660), where $$(JL \times 1)h(b) = \begin{bmatrix} h_1(0, b) \\ \vdots \\ h_1(L-1, b) \\ \vdots \\ h_J(0, b) \\ \vdots \\ h_J(L-1, b) \end{bmatrix}$$

and $$(JL \times V_T)G_B = \begin{bmatrix} g_{1,B}^T(0) \\ \vdots \\ g_{1,B}^T(L-1) \\ \vdots \\ g_{J,B}^T(0) \\ \vdots \\ g_{J,B}^T(L-1) \end{bmatrix}$$

Note that any preexisting channel estimating techniques may compute the provided estimates. The Doppler channel estimates are now computed at time B+1, $G_{B+1}$; as a function of the Doppler matrix at time B+1, the Doppler vector at time B+1, the Doppler channel estimates at time B, and the channel estimate at time B+1 (670). The equation for $G_{B+1}$ is $G_{B+1} = G_B R_{B+1} + h(B+1)r_{B+1}$, where $G_0 = 0$. Depending on the estimating system and combining weights used in block 660, the process may end here (685). If required however (675), the process completes by computing the time varying channel at any time as a function of the Doppler parameterization vector at any time and the Doppler channel estimates, $h(n) = G_{B+1}q(n)$ (block 680).

The present invention may be embodied in other specific forms without departing from its spirit or essential characteristics. The described embodiments are to be considered in all respects only as illustrative and not restrictive.

We claim:

1. A method of operating a communication system, the method comprising the steps of:

producing a plurality of Doppler channels, wherein the Doppler channels are channel estimates produced at a plurality of differing times, and wherein a time-varying channel is represented as a sum of multiple time-invariant Doppler channels;

computing a Doppler matrix from the plurality of Doppler channels; and determining a channel estimate from a preexisting channel estimate and the Doppler matrix.

2. The method of claim 1 wherein the Doppler matrix $R_B$ is computed according to $$(V_T \times V_T)R_B = I_{V_T} - q(B)r_B \text{ and}$$

$$(1 \times V_T)r_B = \frac{q^H(B)(Q_{B-1} Q_{B-1}^H)^{-1}}{1 + q^H(B)(Q_{B-1} Q_{B-1}^H)^{-1} q(B)},$$

wherein $$(V_T \times B)Q_B = [q(1) \ldots q(B)] \text{ and}$$

$$(V_T \times 1)q(b) = \begin{bmatrix} e^{-j2\pi Vb/N_k} \\ \vdots \\ e^{+j2\pi Vb/N_k} \end{bmatrix}.$$

3. A method of operating a communication system including at least one receiver comprising:

initializing a time varying channel update device by computing a Doppler vector at time B+1, as a function of the Doppler Parameterization matrix at the times of interest $Q_B$, and the Doppler parameterization vector at time B; and computing an updated device estimation by providing Doppler channel estimates as a function of a Doppler matrix at time B+1, a Doppler vector at time B+1, a Doppler channel estimate at time B, and a channel estimate at time B+1 using a channel estimate at time B+1, and the Doppler channel estimates at time B.

4. The method of claim 3 wherein the Doppler matrix $R_B$ is computed according to $$(V_T \times V_T)R_B = I_{V_T} - q(B)r_B \text{ and}$$

$$(1 \times V_T)r_B = \frac{q^H(B)(Q_{B-1}Q_{B-1}^H)^{-1}}{1 + q^H(B)(Q_{B-1}Q_{B-1}^H)^{-1}q(B)},$$

wherein $$(V_T \times B)Q_B = [q(1) \ldots q(B)] \text{ and}$$

$$(V_T \times 1)q(b) = \begin{bmatrix} e^{-j2\pi Vb/N_k} \\ \vdots \\ e^{+j2\pi Vb/N_k} \end{bmatrix}.$$

5. The method of claim 3 wherein the Doppler vector $r_B$ is computed according to $$(V_T \times V_T)R_B = I_{V_T} - q(B)r_B \text{ and}$$

$$(1 \times V_T)r_B = \frac{q^H(B)(Q_{B-1}Q_{B-1}^H)^{-1}}{1 + q^H(B)(Q_{B-1}Q_{B-1}^H)^{-1}q(B)},$$

wherein $$(V_T \times B)Q_B = [q(1) \ldots q(B)] \text{ and}$$

$$(V_T \times 1)q(b) = \begin{bmatrix} e^{-j2\pi VbIN_k} \\ \vdots \\ e^{+j2\pi VbIN_k} \end{bmatrix}.$$

6. The method of claim 3 wherein the updated Doppler channel estimate G is computed according to $G_{B+1}$ is $G_{B+1} = G_B R_{B+1} + h(B+1)r_{B+1}$, wherein $G_0 = 0$.

7. The method of claim 3 wherein the time varying channel h is computed according to $h(n) = G_{B+1}q(n)$.

8. A receiver for a wireless communication system comprising:

means for producing a plurality of Doppler channels, wherein the Doppler channels are channel estimates produced at a plurality of differing times, and wherein a time-varying channel is represented as a sum of multiple time-invariant Doppler channels;

means for computing a Doppler matrix from the plurality of Doppler channels; and means for determining a channel estimate from a preexisting channel estimate and the Doppler matrix.

* * * * *